United States Patent
Coronado et al.

(10) Patent No.: US 9,875,094 B2
(45) Date of Patent: Jan. 23, 2018

(54) MICROCODE UPGRADE IN A STORAGE SYSTEM

(75) Inventors: Juan A. Coronado, Tucson, AZ (US); Lee C. LaFrese, Tucson, AZ (US); Lisa R. Martinez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 13/598,068

(22) Filed: Aug. 29, 2012

(65) Prior Publication Data

US 2014/0068566 A1 Mar. 6, 2014

(51) Int. Cl.
G06F 9/44 (2006.01)
G06F 9/445 (2006.01)

(52) U.S. Cl.
CPC .................... G06F 8/665 (2013.01)

(58) Field of Classification Search
CPC ........................................ G06F 8/665
USPC ........................................ 717/127
See application file for complete search history.

(56) References Cited

U.S. PATENT DOCUMENTS

| | | | | |
|---|---|---|---|---|
| 4,701,845 A | * | 10/1987 | Andreasen | G06F 11/22 714/31 |
| 7,136,768 B1 | * | 11/2006 | Shah | G06F 11/008 702/115 |
| 7,293,169 B1 | | 11/2007 | Righi et al. | |
| 7,330,897 B2 | | 2/2008 | Baldwin et al. | |
| 7,392,148 B2 | | 6/2008 | Basham et al. | |
| 8,219,794 B1 | | 7/2012 | Wang et al. | |
| 9,146,726 B2 | | 9/2015 | Jibbe et al. | |
| 2004/0019752 A1 | * | 1/2004 | Burton et al. | 711/154 |
| 2004/0078185 A1 | * | 4/2004 | Briggs et al. | 703/24 |
| 2004/0102925 A1 | * | 5/2004 | Giffords | 702/182 |
| 2004/0255286 A1 | * | 12/2004 | Rothman et al. | 717/168 |
| 2005/0015566 A1 | | 1/2005 | Zohar et al. | |
| 2005/0132154 A1 | | 6/2005 | Rao et al. | |
| 2006/0265172 A1 | * | 11/2006 | Basham | G06F 11/26 702/117 |
| 2007/0266137 A1 | * | 11/2007 | Malik | H04L 12/2697 709/223 |
| 2008/0046710 A1 | * | 2/2008 | Maddocks et al. | 713/2 |
| 2009/0177878 A1 | | 7/2009 | Gao et al. | |
| 2010/0281474 A1 | * | 11/2010 | Eason et al. | 717/172 |
| 2010/0318981 A1 | | 12/2010 | Helman et al. | |
| 2012/0042139 A1 | | 2/2012 | Coronado et al. | |
| 2012/0096250 A1 | | 4/2012 | Aloni et al. | |
| 2012/0102350 A1 | * | 4/2012 | Belluomini et al. | 713/324 |

* cited by examiner

*Primary Examiner* — Li B Zhen
*Assistant Examiner* — Sen Chen
(74) *Attorney, Agent, or Firm* — Heather S. Chatterton

(57) ABSTRACT

A method for upgrading microcode in a multi-module storage system may include selecting a first module from two or more modules and operating the first module using an upgraded microcode. The method may include monitoring the performance of the first module by a second module of the two or more modules and rendering an indication of performance of the first module. Further, the method may include determining whether the indication of performance of the first module is greater than or equal to a performance metric.

19 Claims, 4 Drawing Sheets

US 9,875,094 B2

MICROCODE UPGRADE IN A STORAGE SYSTEM

FIELD

This disclosure relates generally to computer storage systems and specifically to storage systems having multiple networked storage devices.

BACKGROUND

Traditionally, the non-volatile storage needs of computer systems were served by one or more disk drives locally attached to the systems. Operating systems maintained their own file management systems for the dedicated disk drives. Storage area networks evolved from the traditional dedicated memory architecture. A storage area network operates according to a client/server model. A storage area network may include one or more servers and a plurality of storage devices, typically disk drives. In addition, a storage area network may appear to a client computer system as a locally-attached storage device. A storage area network may allow a client to access data in units of blocks. Further, a storage area network may allow the sharing of data on two or more different computers, even if the computers employ different file management systems.

Another development is storage virtualization. A virtual storage device appears to a client as a logical storage location. The physical storage location or locations are hidden from the client. A virtual storage server handles the process of mapping data to physical locations. The storage virtualization paradigm may be incorporated into a storage area network.

SUMMARY

One embodiment is directed to a method for upgrading microcode in a multi-module storage system. The method may include selecting a first module from two or more modules and operating the first module using an upgraded microcode. In addition, the method may include monitoring the performance of the first module by a second module of the two or more modules and rendering an indication of performance of the first module. Further, the method may include determining whether the indication of performance of the first module is greater than or equal to a performance metric.

Another embodiment is directed to a multi-module storage system. The storage system may include a first module to operate using an upgraded microcode and a second module to monitor performance of the first module. One of the first and second modules may determine whether performance of the first module is greater than or equal to a performance metric. In addition, the storage system may include a unit to render an indication of performance of the first module.

Yet another embodiment is directed to a computer-readable storage medium.

DETAILED DESCRIPTION

Figure 1:
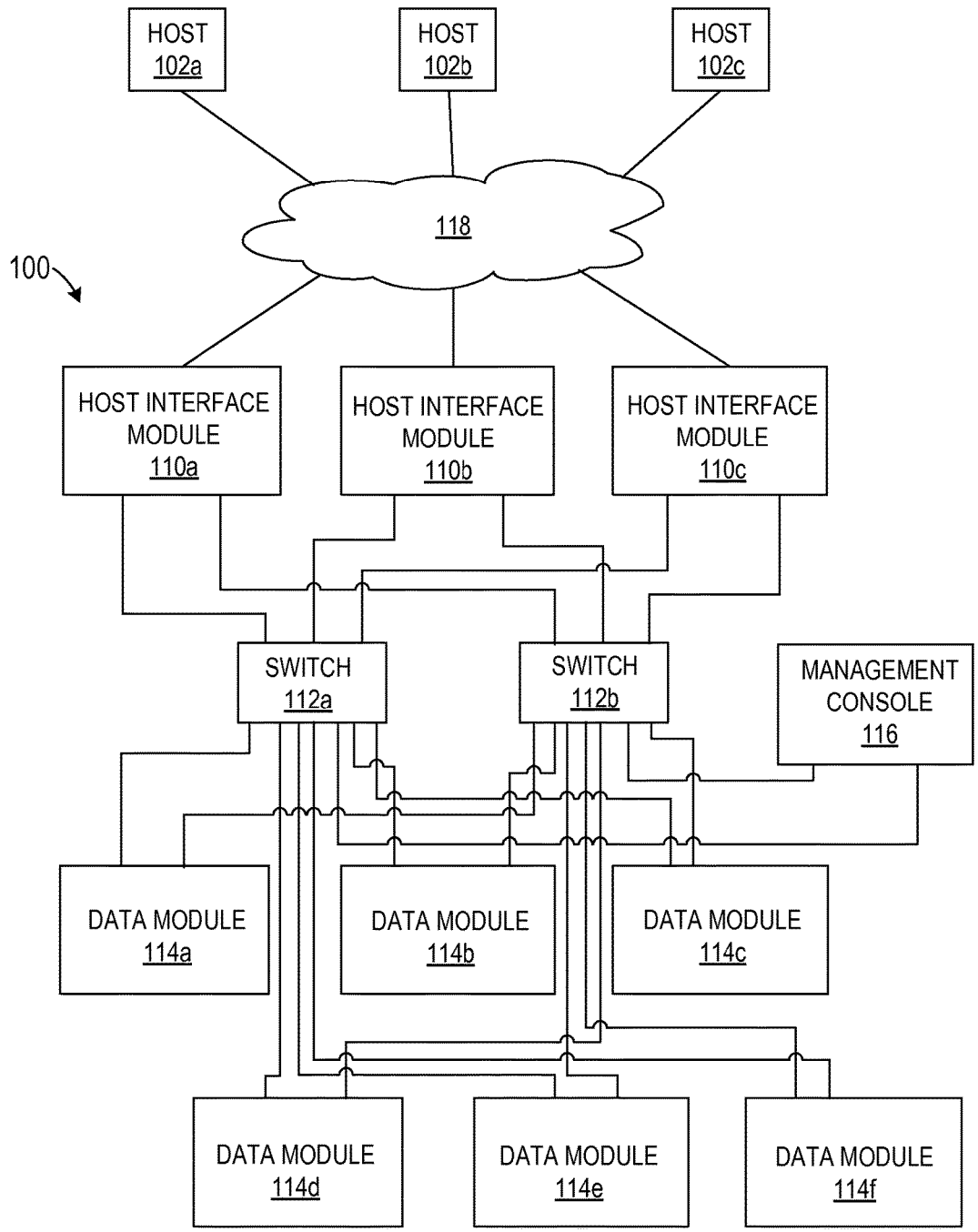
FIG. 1 is a schematic block diagram illustrating one embodiment of a storage system.

FIG. 1 is a schematic block diagram illustrating one embodiment of a multi-module storage system 100 that serves one or more the hosts 102. The storage system 100 is one exemplary context in which embodiments may be implemented. The storage system 100 may include one or more host interface modules 110, one or more switches 112, one or more data modules 114, and a management console 116. The storage system 100 may include various adaptors and other components (not shown).

The hosts 102 may be any type of client computer system. The hosts 102 may communicate directly with the host interface modules 110. Alternatively, the hosts 102 may communicate with the host interface modules 110 through a network 118. The network 118 may be a public or a private network. The network 118 may be a single network or a system of interconnected networks. The network 118 may link nodes by wire, wirelessly, via optical fiber, or by any suitable physical transmission media. As one example, the network 118 may be the Internet. As another example, the network 118 may be a private Ethernet network.

The host interface modules 110 may communicate with the data modules 114 or with each other through the switches 112. The switches 112 may be Ethernet switches, infiniBand Module interconnects, or any other suitable switching device. One of the host interface modules 110 may be designated as a supervisory node.

Figure 2:
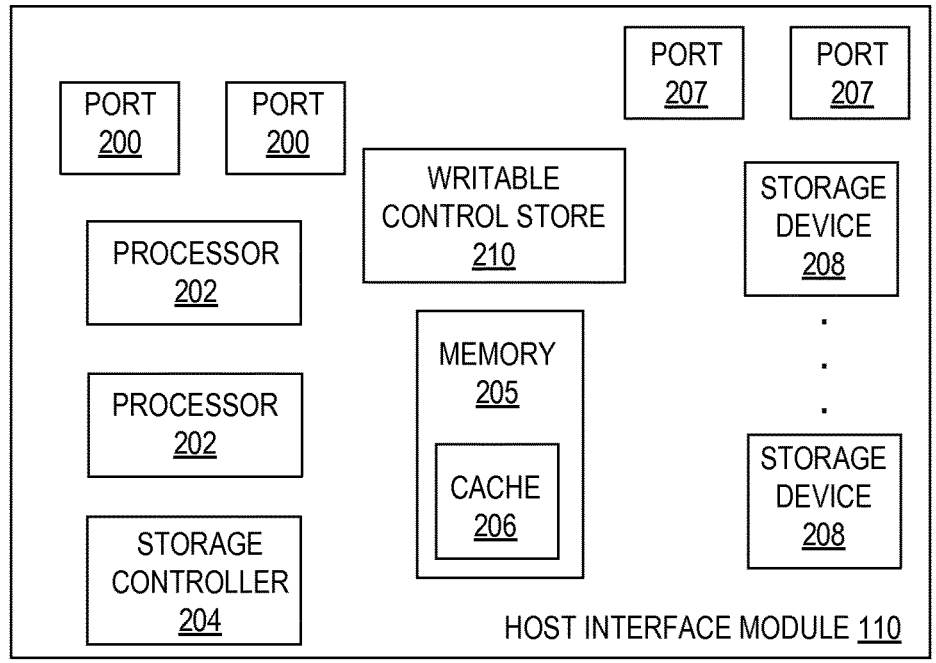
FIG. 2 is a schematic block diagram illustrating one embodiment of a host interface module.

FIG. 2 is a schematic block diagram illustrating one embodiment of a host interface module 110. The host interface modules 110 may include iSCSI or Fibre Channel ports 200 for communicatively coupling with the hosts 102 or network 118. The host interface modules 110 may include one or more processors 202, a storage controller 204, and a memory 205. The memory 205 may include a cache memory 206. In addition, a host interface module 110 may include one or more storage devices 208. Alternatively, the host interface module 110 may be coupled with one or more external storage devices 208. In either alternative, the host interface module 110 may be coupled with storage devices 208 via one or more ports 207. In one embodiment, a host interface module 110 includes twelve storage devices 208. The host interface modules 110 may include other components, including a writable control store 210 for storing microcode. In addition, each storage device 208 may include a writable control store (not shown). A writable control store may be any suitable non-volatile memory, such as a read-only memory, an EPROM, an EEPROM, or a flash memory. In one alternative, a writable control store may be a volatile memory.

Figure 3:
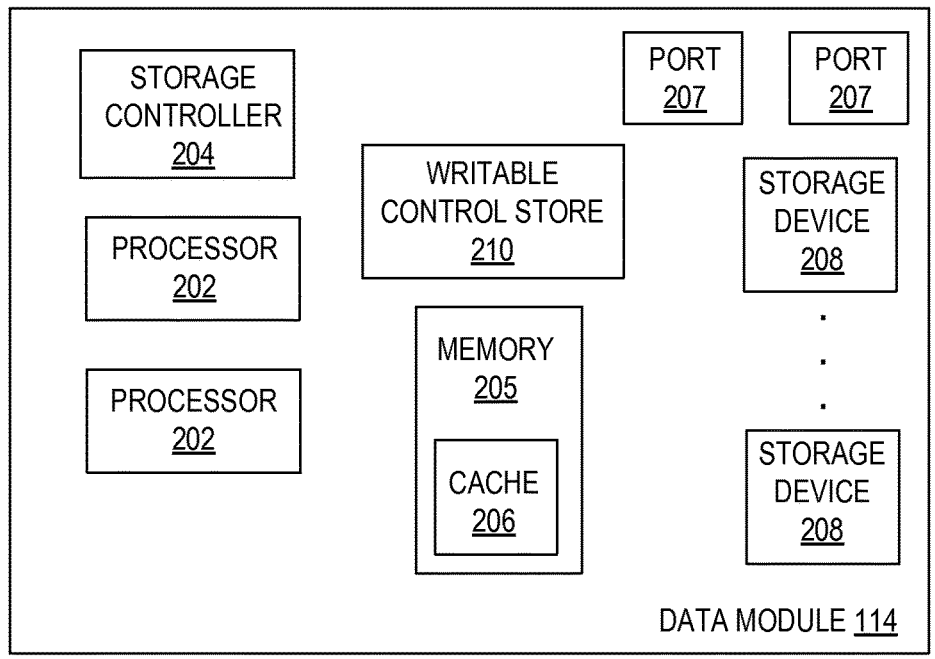
FIG. 3 is a schematic block diagram illustrating one embodiment of a data module.

FIG. 3 is a schematic block diagram illustrating one embodiment of a data module 114. Each data module 114 may include one or more processors 202, a storage controller 204, and a memory 205. The memory 205 may include a cache memory 206. In addition, a data module 114 may include one or more storage devices 208. Alternatively, the data module 114 may be coupled with one or more external storage devices 208. In either alternative, the data module 114 may be coupled with storage devices 208 via one or more ports 207. In one embodiment, a data module 114 includes twelve storage devices 208 for collectively storing 2 or 3 TB of data. The data modules 114 may include other components, including a writable control store 210 for storing microcode. In addition, each storage device 208 may include a writable control store (not shown). As mentioned, a writable control store may be any suitable non-volatile memory, such as a read-only memory, an EPROM, an EEPROM, or a flash memory. In one alternative, a writable control store may be a volatile memory.

In one embodiment, the storage devices 208 may be Serial Advanced Technology Attachment (SATA) disk drives. In various alternatives, the storage devices 208 may be other types of storage devices, such as Parallel Advanced Technology Attachment (PATA) disk drives, tape drives, optical storage media, or flash memory drives. The cache memories 206 may be used for caching data previously read, pre-fetching of data from a storage device 208, delayed de-staging of previously written data, or for other purposes.

In one embodiment, one or more storage devices 208 or one or more portions of storage devices 208 may be organized as a logical volume. The hosts 102 may store or fetch data from logical volumes. The physical storage devices 208 may be hidden from the hosts. The host interface modules 110 and the data modules 114 may implement a data distribution process when a host 102 provides data for storage. When a host requests data, the host interface modules 110 and the data module 114 fetch the data from the distributed locations. The data distribution process may similarly be hidden from the hosts 102.

A host 102 may store and retrieve data from one or more logical volumes. A logical volume may include multiple partitions. Host data may be divided into partitions and distributed among the storage devices 208 of the data modules 114. For example, if there are three data modules 114, each having 12 storage devices 208, host data may be distributed among the 36 storage devices 208. Partitions may be distributed uniformly among the storage devices 208. In addition, partitions may be pseudo-randomly distributed among the storage devices 208. As one example, a volume may be a multiple of 17 MB and a partition may be 1 MB.

To provide a backup in case of the failure of one of the storage devices 208, each partition may be "mirrored" or stored more than once, once as a primary partition and again as a secondary partition on a different device. If a data module 114 fails or is removed from the storage system 100, the host interface modules 110 and the data modules 114 may redistribute data among the remaining data modules 114. If a data module 114 is added to the storage system 100, the host interface modules 110 and the data modules 114 may redistribute data among the data modules 114 thereby rebalancing the distribution of data. The minoring techniques that the storage system 100 performs may be hidden from the hosts 102.

The switches 112 permit communications between two host interface modules 110, between two data modules 114, or between a host interface module 110 and a data module 114. Implementing the data distribution and mirroring techniques requires multiple communications between the modules 110, 114 and the storage devices 208. In addition, servicing host requests requires multiple communications between the modules 110, 114 and the storage devices 208. Because a typical storage system 100 may simultaneously serve multiple hosts 102, there may generally be a significant volume of communication between the modules 110, 114 and the storage devices 208 in a production environment.

Referring again to FIG. 1, the storage system 100 may be organized as a grid network in which the host interface modules 110 and the data modules 114 are nodes. As mentioned, one of the host interface modules 110 may be designated as a systems management node. If the designated systems management node fails or is otherwise unable to serve as the systems management node, a different host interface module 110 may be designated as the systems management node. The systems management node may include a file system that maintains the identities of the host interface modules 110 and the data modules 114 in the storage system 100, including the identities of their respective storage devices 208. The systems management node may perform a variety of supervisory and administrative functions. The data modules 114 or the storage devices 208 may be designated as data nodes.

The management console 116 may be a computer system that performs various functions including providing a user interface for an online monitoring and a command line interface tool. A user may use the management console 116 to configure and monitor the storage system 100. For example, a user may run a variety of utilities using the management console 116. In addition, a user may use the command line interface tool to run a variety of scripts developed for a particular instance of the system 100. Because of the possibly unique nature of particular user scripts and the fact that they are generally unavailable to the manufacturer of the system 100, new versions of microcode for the system 100 may not be tested for compatibility with every user script.

Each of the host interface modules 110, data modules 114, and storage devices 208 may include "microcode." The host interface modules 110 and data modules 114 may each include one or more processors, controllers, logic units, storage controllers, or other devices that may execute a sequence of instructions. There may be a distinct set of microcode for each of these components. Microcode may translate higher level machine code instructions into circuit level operations. In addition, the term microcode, as used herein, may include machine code, machine language, or firmware. The term microcode, as used herein, may include the distinct set of microcode for any one of the modules 110, 114 or storage devices 208. In particular, the term microcode, as used herein, may include disk drive firmware. In one embodiment, the term microcode does not include the compiled or non-compiled instructions of a high-level programming language. Further, the term microcode, as used herein, may include microcode for any other component of a host interface module 110 or a data module 114, such as a processor, controller, logic unit, or storage controller. While examples may be described below with respect to microcode for data modules 114, it is contemplated that the principals of the invention disclosed herein may be employed with respect to microcode or disk drive firmware for storage devices 208, or any other component of the modules 110, 114 or the storage system 100.

While microcode is typically stored in a writable control store 210 during manufacturing, it may be necessary or desirable to replace the original microcode or a current version of microcode with a new version from time to time. For example, a new or upgraded version may correct a problem not discovered during development or may implement a feature not present in the current version of microcode. Typically, when a different version of microcode is installed, it is necessary to reboot the module or other device before the new microcode may be used. As described below, benchmark performance statistics may be generated from one or more modules being operated using a current version of microcode. The term "current" microcode may refer to any version of microcode that is known or deemed to be a suitable version of microcode for use in obtaining benchmark performance statistics. Accordingly, a current microcode, as used herein, may not be the most-current version of particular microcode, and, for purposes of this disclosure, there may be one than one version of microcode that qualifies as current microcode.

Figure 4:
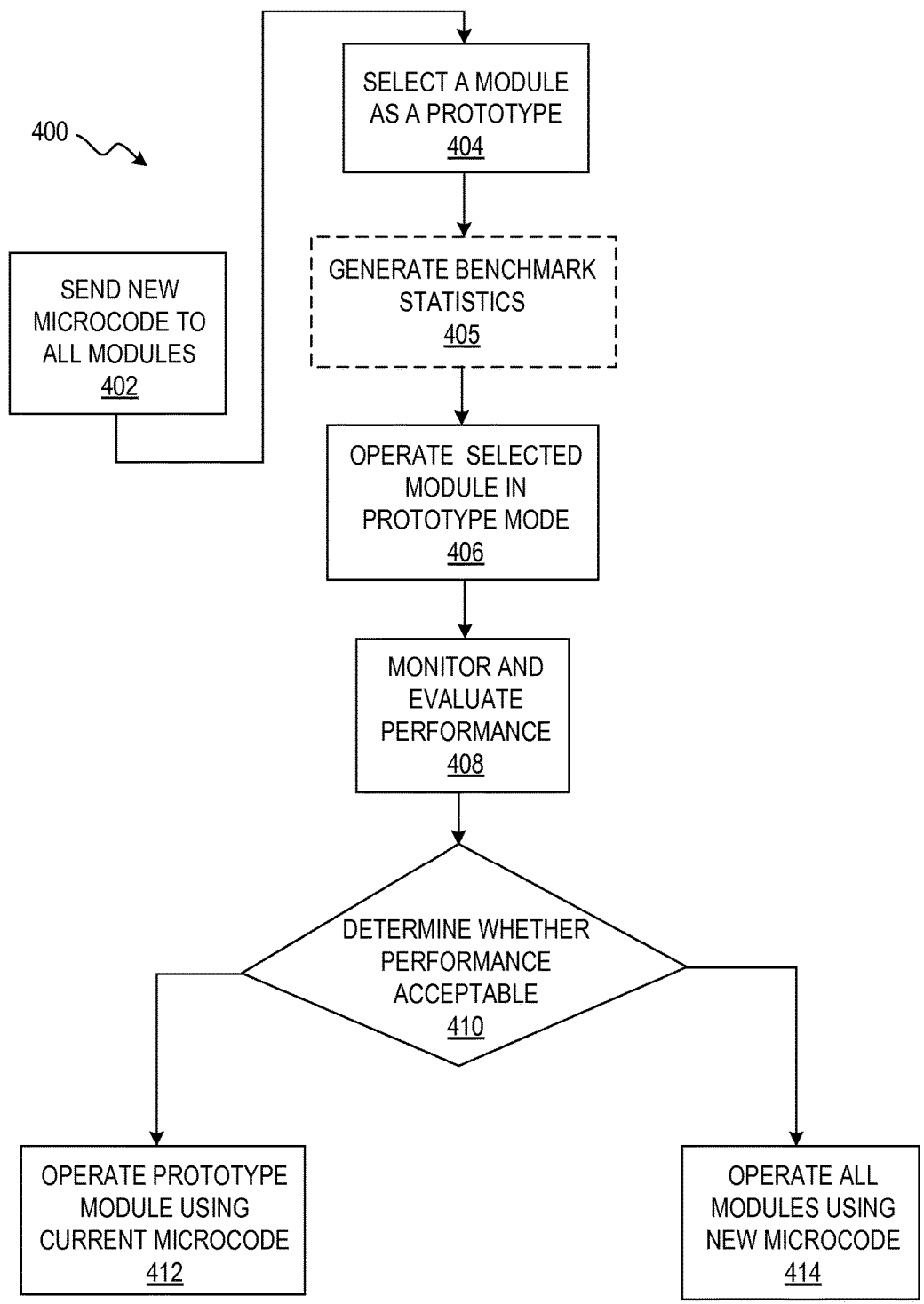
FIG. 4 is a flow chart illustrating one embodiment of a method for upgrading microcode in a storage system.

FIG. 4 is a flow chart illustrating one embodiment of a method 400 for upgrading microcode in a storage system. In operation 402, an upgraded version of microcode may be copied or written to every module in the storage system 100. The new version of microcode may be copied to every host interface module 110 and to every data module 114. If the microcode is storage device microcode, the upgraded version of microcode may be copied to every storage device 208. If the microcode is for a component of a particular type, the new version of microcode may be copied to every component of that type. In one alternative, the new version of microcode may be copied only to a single module, device, or component designated as a prototype module. For example, the new version of microcode may be copied only to a single data module 114. As another example, the new version of microcode may be copied only to a single storage device 208. In yet another alternative, the new version of microcode may be copied to more than one but fewer than all of modules, devices, and components in the storage system 100.

In operation 404, the prototype module may be selected. A data module 114 may be selected as the prototype module. The prototype module may be selected using any suitable technique. In one embodiment, each data module 114 determines its workload and may volunteer to serve as the prototype module if its capacity utilization is less than a particular capacity threshold. Alternatively, each data module 114 may determine the type of work it is currently performing and volunteer to serve as the prototype module if the type of work it is performing is less important than a particular threshold of importance. The systems management node may select a volunteer as the prototype module. In certain circumstances, there may be more than one volunteer. In various embodiments, the systems management node may compare the current workloads of each module 114, or the types of work currently being performed by each module 114, or both. The systems management node may select a module with the lowest workload, the one performing the least important work, or the one with the lowest availability score. An availability score for a module may be determined as a function of both capacity utilization and type of work currently being performed. In yet another embodiment, a predetermined module 114 may be designated as the prototype module. In still another embodiment, a user may select a module 114 as the prototype module.

The method 400 may include an optional operation 405 in which performance of the selected prototype module using a current microcode and running under normal input/output (IO) may be monitored for a particular period of time. The particular period of time may be long enough to obtain a meaningful measure of performance. For example, the particular period may be 0.5-24 hours. Monitoring performance may include determining the time the prototype module takes to respond to communications or perform various operations. Monitoring may include determining whether any components of the prototype module fail. Operation 405 may include generating various benchmark statistics, such as averages, minimums, and maximums, from monitoring data. A benchmark statistic may be employed as a performance metric. Operation 405 may include storing the monitoring data, benchmark performance statistics, and performance metrics.

In an alternative embodiment, the optional operation 405 may include monitoring performance for each data module 114 using a current microcode in the system 100 running under normal IO for a particular period of time. In one embodiment, one or more, but fewer than all, of the data modules 114 in the system 100 may be monitored while running under normal IO. The particular period of time may be long enough to obtain a meaningful measure of performance. For example, the particular period may be 0.5-24 hours. Monitoring performance may include determining the time each data module 114 takes to respond to communications or perform various operations. Monitoring may include determining whether any components of the data modules 114 fail. Operation 405 may include generating various benchmark aggregate statistics, such as averages, minimums, and maximums for the group of data modules 114, from monitoring data. A benchmark aggregate statistic may be employed as a performance metric. Operation 405 may include storing the monitoring data, benchmark aggregate performance statistics, and performance metrics.

In operation 406, the data module 114 selected as the prototype module may begin operating using the new microcode, i.e., in prototype mode. The operation 406 may include notifying each module in the storage system 100 of the identity, e.g., the network address, of the prototype module. The prototype module itself or some other module or node may broadcast the address of the prototype module to the other nodes. The operation 406 may include rebooting the prototype module so that it may begin operating using the new microcode. In addition, the operation 408 may include the systems management node or the prototype module notifying each module in the storage system 100 that the prototype module is operating in prototype mode.

In operation 408, the performance of the prototype module may be monitored and evaluated. In one embodiment, each module in the storage system 100 may monitor the performance of the prototype module. The operation 408 may include the host interface modules 110 and the data modules 114 monitoring the performance of the prototype module, as well as the prototype module monitoring its own performance. In one alternative, fewer than every module in the storage system 100 monitors the performance of the prototype module. Monitoring performance may include determining the time the prototype module takes to respond to communications or perform various operations. Monitoring may include determining whether any components of the prototype module fail.

Operation 408 may include one or more tests of the ability of the prototype module to perform operations associated with utilities and user scripts. Operation 408 may include initiating one or more utility functions or initiating one or more user scripts. A user script includes command line interface (CLI) commands. Operation 408 may include encapsulating the CLI scripts of a particular user. The operation 408 may direct CLI scripts to the prototype module or otherwise cause one or more of the encapsulated CLI commands to exercise a function of the prototype module. In addition, an encapsulation process may control the prototype module so that the commands are run in a test environment. In a test environment, the prototype module does not make any changes or modifications to host data or the system 100 as a whole.

In one alternative, the operation 408 may include identifying and saving one instance of each CLI command that a particular user employs in its scripts. Each CLI command is saved together with the same parameters used in the scripts. One or more data modules 408 may be designated as a test administering module. The test administering module initiates each CLI command, directing the commands to the prototype module. In addition, the test administering module may control the prototype module so that the commands are run only as a test. The prototype module may be controlled so that it does not make any changes or modifications to the system 100 as a whole.

In operation 410, it may be determined whether the performance of the prototype module is acceptable. The operation 410 may include determining whether the latency with which the prototype module responds to communications increases relative to a particular performance statistic or metric. Monitoring may additionally include determining whether components of the prototype module fail at a higher rate than a particular performance statistic or metric. The particular performance statistic or metric may be a benchmark statistic or a benchmark aggregate statistic determined in operation 405 using one or modules running under a current microcode. Alternatively, the particular performance statistic or metric may be a predetermined statistic or metric. As one example, a predetermined statistic or metric may be manufacturer specification generally applicable to all modules produced. The operation 410 may also include determining whether the prototype module fails to respond to communications, which may be considered a particular performance metric. In one embodiment, a failure to respond to a communication request in a generally applicable maximum time or a complete failure to respond to a communication request may be predetermined metrics.

Operation 410 may include determining whether particular CLI commands are performed correctly under the new version of microcode. If the failure of a particular CLI is detected, data regarding how the command failed may be collected. Examples of failures include: an option within a command not being recognized or a command not being recognized. In one embodiment, the determination of whether particular CLI commands are performed correctly under the new version of microcode may be included in operation 408.

The operation 410 may include determining whether the performance of the prototype module is acceptable. In one embodiment, if the performance of the prototype module is not worse than a performance metric, it may be determined that the performance of the prototype module is acceptable. In one alternative, if the performance of the prototype module is within one standard deviation of an average performance statistic or metric, it may be determined that the performance of the prototype module is acceptable. In another alternative, if the performance of the prototype module is better than a performance statistic or metric by a particular margin, it may be determined that the performance of the prototype module is acceptable. In yet another embodiment, a performance metric may be that a CLI command operation is performed correctly: If all tested CLI commands operate correctly, it may be determined that the performance of the prototype module is acceptable.

Operation 410 may include providing a performance report to a user. For example, the performance report may be printed, displayed, or otherwise rendered by or in the management console 116. The performance report may include monitoring data and particular performance statistics for the prototype, as well as benchmark performance statistics or metrics. The performance report may be rendered a particular time after the prototype module begins operating in prototype mode. As one example, the performance report may be rendered 0.5-24 hours after the prototype module begins operating in prototype mode. Alternatively or additionally, the performance report may be rendered at a time when monitoring indicates that the performance of the prototype module is below a particular threshold or metric. For example, the performance report may be rendered at a time when monitoring indicates that the latency of the prototype module in responding to other modules, or in storing or fetching data is significant. In one embodiment, a user may determine whether the performance of the prototype module is acceptable based on a review of a performance report.

Operation 412 may be performed if it is determined that the performance of the prototype module is not acceptable. The operation 412 may include removing the upgraded microcode from the prototype module, installing the version of microcode that was previously installed on the prototype module, i.e., the current microcode, and rebooting the prototype module. In addition, operation 412 may include changing the mode of the prototype module to normal mode.

Operation 414 may be performed if it is determined that the performance of the prototype module is acceptable. Operation 414 may include installing the upgraded microcode on all of the host interface and data modules 110, 114. Operation 414 may include rebooting the host interface and data modules 110, 114. In addition, operation 414 may include changing the mode of the prototype module to normal mode. In one embodiment, the operation 414 may include installing the upgraded microcode on all of the storage devices 208.

Figure 5:
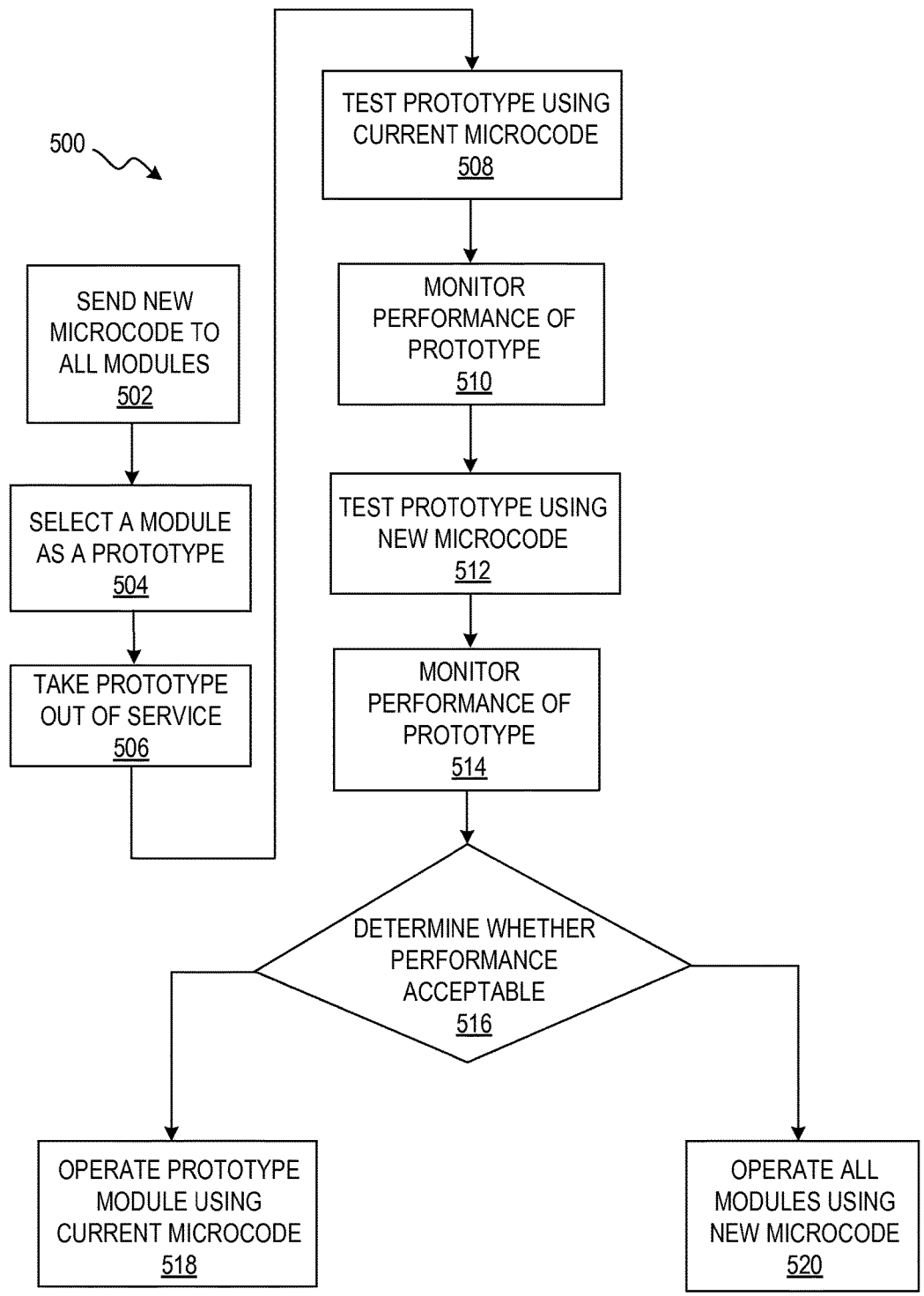
FIG. 5 is a flow chart illustrating an alternate embodiment of a method for upgrading microcode in a storage system.
In the Figures and the Detailed Description, like numbers refer to like elements.

FIG. 5 is a flow chart illustrating one alternative embodiment of a process 500 for upgrading microcode in a storage system. The process 500 may include an operation 502 in which a new version of microcode may be copied or written to every module in the storage system 100. The operation 502 may be the same as the operation 402 described above. A prototype module may be selected in an operation 504. The operation 504 may be the same as the operation 404 described above.

In operation 506, the data module 114 selected as the prototype module may be taken out of service. A module 114 that has been taken out of service no longer handles any IO requested by a host that requires access to the storage devices 208 within the module. In operation 508, another data module 114 runs test IO operations, i.e., using test data, with the prototype module. In particular, operation 508 includes operating the prototype module under a current microcode in a test environment using non-production data. In operation 510, performance of the prototype module may be monitored for a particular period of time. For example, the particular period may be 0.5-24 hours. The performance may be monitored by the test administering module, by the prototype module, or by both modules. The performance statistics may be saved in a memory of the prototype module as benchmark performance statistics. In various alternative embodiments, the performance statistics may be saved in a memory of a module other than the prototype module. The benchmark performance statistics are determined in operation 508 with the prototype module operating using a current microcode and may be used as a performance metric in operation 516.

An operation 512 may be performed following the conclusion of the particular test period used in operation 510. In operation 512, the upgraded microcode may be installed on the prototype module and the module may reboot. Once the prototype module is operating using the new or upgraded microcode, the test administering module may repeat the test IO operations that were performed in operation 508. The operation 512 may be performed in a test environment. In operation 514, performance of the prototype module may be monitored for the same period of time as used in operation 510. The performance may be monitored by the test administering module, by the prototype module, or by both modules. Performance statistics may be calculated and may be saved in a memory of the prototype module. In various alternative embodiments, the performance statistics may be calculated and saved in a memory of a module other than the prototype module.

The operation 516 may be performed after operation 514 is complete. Operation 516 may include determining whether the performance of the prototype module is acceptable. The operation 516 may include comparing one or more benchmark performance statistics or metrics with the performance statistics obtained using the upgraded microcode. The operation 516 may include determining whether the latency with which the prototype module responds to communications increases relative to a benchmark performance statistic or metric. The operation 516 may include determining whether components of the prototype module fail at a higher rate than a rate of a benchmark performance statistic or metric. The operation 516 may also include determining whether the prototype module fails to respond to communications, a communication failure being a particular performance metric. In one embodiment, the operation 516 may be performed by the prototype module. The operation 516 may be performed by a module other than the prototype module.

In one embodiment, the test IO operations performed in operations 508 and 512 may include performing particular CLI commands. In this embodiment, the performance monitoring operations 510 and 514 may include determining whether particular CLI commands operate correctly. All CLI commands employed in the scripts of a particular user may be tested. The correct operation of a CLI command may be a particular performance metric.

In one embodiment, if the performance of the prototype module is greater than or equal to one or more benchmark performance statistics or metrics, it may be determined that the performance of the prototype module is acceptable. In another alternative, if the performance of the prototype module is better than one or more benchmark performance statistics or metrics by a particular margin, it may be determined that the performance of the prototype module is acceptable. In yet another embodiment, if all tested CLI commands operate correctly, it may be determined that the performance of the prototype module is acceptable.

Operation 516 may include providing a performance report to a user. For example, the performance report may be printed, displayed, or otherwise rendered by the management console 116. The performance report may include monitoring data and particular performance statistics for the prototype, as well as benchmark performance statistics or metrics. The performance report may be rendered at any suitable time.

Operation 518 may be performed if it is determined that the performance of the prototype module is not acceptable. The operation 518 may include removing the upgraded microcode from the prototype module, installing the version of microcode that was previously installed on the prototype module, i.e., the current microcode, and rebooting the prototype module. In addition, operation 518 may include changing the mode of the prototype module to normal mode, and placing the prototype module in service.

Operation 520 may be performed if it is determined that the performance of the prototype module is acceptable. Operation 520 may include any operation required to activate the new or upgraded microcode on the host and data modules 110, 114. Operation 520 may include rebooting the host and data modules 110, 114. In addition, operation 520 may include changing the mode of the prototype module to normal mode, and placing the prototype module in service.

Exemplary embodiments have been described in the context of a fully functional a multi-module storage system for upgrading microcode on modules or devices. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While this disclosure has described the details of various embodiments shown in the drawings, these details are not intended to limit the scope of the invention as claimed in the appended claims.

The invention claimed is:

1. A method for upgrading microcode in a multi-module storage system, comprising:

selecting a single first module from two or more modules to operate as a prototype module for testing an upgraded microcode for the storage system, the prototype module selected based on an amount of capacity used by each of the two or more modules, each of the two or more modules including a writable control store;

operating the prototype module using the upgraded microcode;

operating a second and a third module of the two or more modules using a current microcode;

monitoring the performance of the prototype module by the second and third modules of the two or more modules, the second and third modules each being one of a host interface module or a data module, the data module comprising one or more processors, a storage controller, a storage device, and a memory, and the host interface module comprising one or more processors, a storage controller, a storage device, and a memory, the host interface module configured to communicate with a host;

rendering an indication of performance of the prototype module;

determining whether the indication of performance of the prototype module is greater than or equal to a performance metric;

configuring the second module to use the upgraded microcode when the performance of the prototype module is greater than or equal to the performance metric; and removing the upgraded microcode from the prototype module and operating the prototype module using a current microcode when the indication of performance of the prototype module is less than the performance metric.

2. The method of claim 1, further comprising generating the performance metric, the generating of the performance metric including monitoring performance of the prototype module when operating using the current microcode.

3. The method of claim 1, further comprising generating the performance metric, the generating of the first performance metric including monitoring performance of two or more modules when each is operating using the current microcode.

4. The method of claim 1, further comprising generating the performance metric, wherein the generating of the performance metric includes determining whether the prototype module fails to respond to a communication.

5. The method of claim 1, further comprising generating the performance metric, wherein the generating of the performance metric includes determining whether the prototype module fails to respond to a communication within a particular time period.

6. The method of claim 1, further comprising generating the performance metric, wherein the generating of the performance metric includes determining a rate at which the prototype module fails.

7. The method of claim 1, further comprising generating the performance metric, wherein the generating of the performance metric includes determining whether a particular command line interface command is recognized by the prototype module.

8. A multi-module storage system, comprising:
a systems management node to select a single first module from two or more modules to operate as a prototype module for testing an upgraded microcode for the storage system, the selection based on a type of work performed by and an amount of capacity used by each of the two or more modules, the prototype module including a processor and a writable control store to store microcode, the first module being one of a host interface module or a data module, wherein a data module comprises one or more processors, a storage controller, a storage device, and a memory, and a host interface module comprises one or more processors, a storage controller, a storage device, and a memory, the host interface module configured to communicate with a host;
a second module to monitor performance of the prototype module, the second module including a processor and a writable control store to store microcode, the second module being one of a host interface module or a data module, wherein
one of the prototype and second modules determines whether performance of the prototype module is greater than or equal to a performance metric;
configuring the second module to use the upgraded microcode when the performance of the prototype module is greater than or equal to the performance metric; and
removing the upgraded microcode from the prototype module and operating the prototype module using a current microcode when the indication of performance of the prototype module is less than the performance metric.

9. The system of claim 8, further comprising a unit to render an indication of performance of the prototype module, wherein the indication of performance includes a rate at which the prototype module fails.

10. The system of claim 8, wherein the prototype module includes one or more storage devices and the upgraded microcode is storage device firmware.

11. The system of claim 8, further comprising a unit to render an indication of performance of the prototype module, the indication of performance including an indication that the prototype module fails to respond to a communication request.

12. The system of claim 8, wherein the prototype module includes logic to generate the performance metric while operating using a current microcode.

13. The system of claim 8, wherein the systems management node includes logic to cause the prototype module to execute a particular command line interface command and to determine whether the particular command line interface command is recognized by the prototype module.

14. The system of claim 8, further comprising a memory to store the performance metric, the performance metric being a predetermined time for responding to a communication request.

15. A non-transitory computer-readable storage medium having executable code stored thereon to cause a machine to perform a method for upgrading microcode in a multi-module storage system, the method comprising:
selecting a single first module from two or more modules to operate as a prototype module for testing an upgraded microcode for the storage system, the prototype module selected based on an amount of capacity used by each of the two or more modules, each of the two or more modules including a writable control store;
operating the prototype module using an upgraded microcode;
monitoring the performance of the prototype module by a second and a third module of the two or more modules, the second and third modules each being one of a host interface module or a data module, the data module comprising one or more processors, a storage controller, a storage device, and a memory, and the host interface module comprising one or more processors, a storage controller, a storage device, and a memory, the host interface module configured to communicate with a host;
rendering an indication of performance of the prototype module; and
determining whether the indication of performance of the prototype module is greater than or equal to a performance metric;
configuring the second module to use the upgraded microcode when the performance of the prototype module is greater than or equal to the performance metric; and
removing the upgraded microcode from the prototype module and operating the prototype module using a current microcode when the indication of performance of the prototype module is less than the performance metric.

16. The computer-readable storage medium of claim 15, further comprising determining whether the indication of performance of the prototype module is greater than or equal to a performance metric.

17. The computer-readable storage medium of claim 16, further comprising generating the performance metric, wherein the generating of the performance metric includes determining a rate at which the prototype module fails.

18. The computer-readable storage medium of claim 16, further comprising generating the performance metric, wherein the generating of the performance metric includes determining whether the prototype module fails to respond to a communication.

19. The computer-readable storage medium of claim 16, further comprising generating the performance metric, wherein the generating of the performance metric includes determining whether a particular command line interface command is recognized by the prototype module.

* * * * *